(12) United States Patent
Subramanian et al.

(10) Patent No.: US 8,190,512 B1
(45) Date of Patent: May 29, 2012

(54) COMPUTER-IMPLEMENTED CLUSTERING SYSTEMS AND METHODS FOR ACTION DETERMINATION

(75) Inventors: Revathi Subramanian, San Diego, CA (US); Vijay S. Desai, San Diego, CA (US); Lizhong Wu, San Diego, CA (US)

(73) Assignee: SAS Institute Inc., Cary, NC (US)

( * ) Notice: Subject to any disclaimer, the term of this patent is extended or adjusted under 35 U.S.C. 154(b) by 409 days.

(21) Appl. No.: 11/851,016

(22) Filed: Sep. 6, 2007

Related U.S. Application Data

(60) Provisional application No. 60/902,379, filed on Feb. 20, 2007.

(51) Int. Cl.
*G06Q 40/00* (2012.01)
(52) U.S. Cl. ............................................ 705/38; 705/35
(58) Field of Classification Search .................... 705/35, 705/38
See application file for complete search history.

(56) References Cited

U.S. PATENT DOCUMENTS

| | | | |
|---|---|---|---|
| 5,335,291 A | 8/1994 | Kramer et al. |
| 5,500,513 A | 3/1996 | Langhans et al. |
| 5,519,319 A | 5/1996 | Smith et al. |
| 5,650,722 A | 7/1997 | Smith et al. |
| 5,675,253 A | 10/1997 | Smith et al. |
| 5,677,955 A | 10/1997 | Doggett et al. |
| 5,761,442 A | 6/1998 | Barr et al. |
| 5,819,226 A | 10/1998 | Gopinathan et al. |
| 5,884,289 A | 3/1999 | Anderson et al. |
| 5,903,830 A | 5/1999 | Joao et al. |
| 5,999,596 A | 12/1999 | Walker et al. |
| 6,021,943 A | 2/2000 | Chastain |
| 6,029,154 A | 2/2000 | Pettitt |
| 6,047,268 A | 4/2000 | Bartoli et al. |
| 6,064,990 A | 5/2000 | Goldsmith |
| 6,122,624 A | 9/2000 | Tetro et al. |
| 6,125,349 A | 9/2000 | Maher |
| 6,128,602 A | 10/2000 | Northington et al. |
| 6,170,744 B1 | 1/2001 | Lee et al. |
| 6,330,546 B1 | 12/2001 | Gopinathan et al. |
| 6,388,592 B1 | 5/2002 | Natarajan |
| 6,422,462 B1 | 7/2002 | Cohen |
| 6,453,206 B1 | 9/2002 | Soraghan et al. |
| 6,516,056 B1 | 2/2003 | Justice et al. |
| 6,549,861 B1 | 4/2003 | Mark et al. |

(Continued)

OTHER PUBLICATIONS

Hodge, Victoria J. et al., "A Survey of Outlier Detection Methodologies," Artificial Intelligence Review, vol. 22, pp. 85-126 (2004).

(Continued)

*Primary Examiner* — Hani M Kazimi
(74) *Attorney, Agent, or Firm* — Jones Day

(57) ABSTRACT

Computer-implemented systems and methods for determining one or more actions to be taken with respect to a first entity. A computer-implemented method can be configured to receive data that is related to characteristics of the first entity as well as data that is related to a plurality of segments. Assignments are determined between the first entity and the segments based upon the characteristics of the first entity and the characteristics associated with the segments. A determined assignment includes a membership probability that is indicative of how probable is membership of the first entity with respect to a segment. One or more actions are determined for the first entity based upon the membership probabilities and action information associated with the assigned segments.

17 Claims, 15 Drawing Sheets

U.S. PATENT DOCUMENTS

| | | | |
|---|---|---|---|
| 6,570,968 | B1 | 5/2003 | Marchand et al. |
| 6,601,049 | B1 | 7/2003 | Cooper |
| 6,631,212 | B1 | 10/2003 | Luo et al. |
| 6,650,779 | B2 | 11/2003 | Vachtesvanos et al. |
| 6,675,145 | B1 | 1/2004 | Yehia et al. |
| 6,678,640 | B2 | 1/2004 | Ishida et al. |
| 7,117,191 | B2 | 10/2006 | Gavan et al. |
| 7,191,150 | B1 | 3/2007 | Shao et al. |
| 7,269,516 | B2 | 9/2007 | Brunner et al. |
| 7,403,922 | B1 | 7/2008 | Lewis et al. |
| 7,455,226 | B1 | 11/2008 | Hammond et al. |
| 7,461,048 | B2 | 12/2008 | Teverovskiy et al. |
| 7,467,119 | B2 | 12/2008 | Saidi et al. |
| 7,480,640 | B1 | 1/2009 | Elad et al. |
| 7,536,348 | B2 | 5/2009 | Shao et al. |
| 7,562,058 | B2 | 7/2009 | Pinto et al. |
| 7,580,798 | B2 | 8/2009 | Brunner et al. |
| 7,761,379 | B2 | 7/2010 | Zoldi et al. |
| 7,765,148 | B2 | 7/2010 | German et al. |
| 2002/0099635 | A1 | 7/2002 | Guiragosian |
| 2002/0138417 | A1 | 9/2002 | Lawrence |
| 2002/0194119 | A1 | 12/2002 | Wright et al. |
| 2003/0093366 | A1 | 5/2003 | Halper et al. |
| 2003/0097330 | A1 | 5/2003 | Hillmer et al. |
| 2003/0191709 | A1 | 10/2003 | Elston et al. |
| 2004/0039688 | A1* | 2/2004 | Sulkowski et al. ............ 705/38 |
| 2005/0055373 | A1 | 3/2005 | Forman |
| 2005/0131873 | A1 | 6/2005 | Fan et al. |
| 2006/0020814 | A1 | 1/2006 | Lieblich et al. |
| 2006/0181411 | A1 | 8/2006 | Fast et al. |
| 2006/0218169 | A1 | 9/2006 | Steinberg et al. |
| 2007/0192167 | A1* | 8/2007 | Lei et al. ......................... 705/10 |
| 2007/0239606 | A1 | 10/2007 | Eisen |
| 2008/0133518 | A1 | 6/2008 | Kapoor et al. |
| 2008/0134236 | A1* | 6/2008 | Iijima et al. .................... 725/34 |

OTHER PUBLICATIONS

Zhu, Xiaojin, "Semi-Supervised Learning with Graphs," Language Technologies Institute, School of Computer Science, Carnegie Mellon University, Doctoral Thesis, pp. i-x and 1-164 (May 2005).

Abdel-Wahhab, O. et al., "Image compression using multi-layer neural networks,", Proceedings of the Second IEEE Symposium on Computers and Communications, vol. 144, Issue 5, pp. 307-312 (Oct. 1997).

Almgren, Magnus et al., "Using Active Learning in Intrusion Detection," Proceedings of the 17th IEEE Computer Security Foundations Workshop, 11 pp. (2004).

Andras, Peter, "The Equivalence of Support Vector Machine and Regularization Neural Networks," Neural Processing Letters, 65, pp. 97-104 (2002).

Gabrys, Bogdan et al., "Combining labeled and unlabelled data in the design of pattern classification systems," International Journal of Approximate Reasoning, 35, pp. 251-273 (2004).

Gunter, Simon, "Multiple Classifier Systems in Offline Cursive Handwriting Recognition," cover page and p. 4 (2004).

Hawkins, Simon et al., "Outlier Detection Using Replicator Neural Networks," Proceedings of the Fifth International Conference and Data Warehousing and Knowledge Discovery, 10 pp. (2002).

Hinterseer, Kris, "The Wolfsberg Anti-Money Laundering Principles," Journal of Money Laundering Control, vol. 5, No. 1 pp. 25-41 (Summer 2001).

Miyazaki, Anthony D. et al., "Internet Privacy and Security: An Examination of Online Retailer Disclosures," Journal of Public Policy & Marketing, vol. 19, No. 1, pp. 54-61 (Spring 2000).

West, David et al., "Neural network ensemble strategies for financial decision applications," Computers & Operations Research, 32, pp. 2543-2559 (2005).

Williams, Graham et al., "A Comparative Study of RNN for Outlier Detection in Data Mining," Proceedings of the 2002 IEEE International Conference on Data Mining 12 pp. (2002).

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'00. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network", IEEE, 0-7803-0532-9/92, pp. II-317-IIII-320 (1992).

Mehrotra, Kishan et al., "Elements of Artificial Neural Networks", MIT Press, pp. 11, 25, 71 76, 85-87, 157, 170-171 (1997).

Tsai, Chieh-Yuan, et al., "A Dynamic Web Service based Data Mining Process System", Proceedings of the 2005 the Fifth International Conference on Computer and Information Technology, pp. 1033-1039 (2005).

Wong, A.S.Y. et al., "A Unified Sequential Method for PCA", IEEE, pp. 583-586 (1999).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

* cited by examiner

MATCH TO FIG.9B

| A | B | C | D | E | F | G | H |
|---|---|---|---|---|---|---|---|
| Entity | | Statement | Merchan. | Credit | Purchase | Raw Data Cash | 1 Cycle |
| Account Number | FICO | Balance | Balance | Limit | Amount | Amount | Delq. Amt. |
| 5490098403730050 | 634 | $400 | $100 | $500 | $25 | $100 | $75 |
| 5490260474410090 | 623 | $413 | $39 | $500 | $16 | $0 | $16 |
| 5490370363980090 | 679 | $125 | $125 | $500 | $43 | $0 | $0 |
| 5490903195240020 | 970 | $6,751 | $6,751 | $10,000 | $4,531 | $0 | $0 |
| 5490854159730100 | 683 | $125 | $125 | $500 | $15 | $0 | $0 |
| 5490771561400050 | 815 | $6,612 | $6,124 | $11,500 | $1,510 | $0 | $409 |
| 5490791745250040 | 988 | $7,200 | $2,633 | $28,800 | $1,458 | $0 | $0 |
| 5490487184050080 | 604 | $396 | $82 | $500 | $34 | $110 | $20 |
| 5490521099190040 | 976 | $6,910 | $2,283 | $27,600 | $1,684 | $225 | $0 |
| 5490083549940060 | 754 | $3,100 | $2,904 | $5,400 | $676 | $120 | $0 |
| 5490369114610090 | 986 | $7,167 | $7,167 | $28,600 | $773 | $0 | $0 |
| 5490408408670060 | 973 | $6,840 | $6,840 | $27,300 | $50 | $0 | $0 |
| 5490211030040040 | 638 | $414 | $57 | $500 | $33 | $250 | $108 |
| 5490369478920040 | 920 | $11,289 | $11,289 | $22,000 | $604 | $220 | $0 |
| 5490914778260030 | 915 | $5,385 | $5,385 | $21,500 | $1,551 | $150 | $0 |
| 5490425176460010 | 961 | $6,528 | $6,528 | $26,100 | $1,382 | $160 | $0 |
| 5490441530840070 | 607 | $462 | $32 | $500 | $29 | $230 | $80 |
| 5490907244070070 | 811 | $7,333 | $7,233 | $11,100 | $2,648 | $0 | $0 |
| 5490446846040030 | 726 | $1,312 | $1,312 | $2,600 | $86 | $125 | $109 |
| 5490469936250040 | 612 | $361 | $85 | $500 | $61 | $125 | $105 |
| 5490765348700000 | 617 | $296 | $10 | $500 | $81 | $0 | $117 |
| 5490871356450070 | 983 | $7,090 | $3,228 | $28,300 | $385 | $275 | $0 |
| 5490326260670000 | 721 | $1,100 | $51 | $2,100 | $65 | $230 | $105 |
| 5490691721110010 | 887 | $4,686 | $4,686 | $18,700 | $2,837 | $220 | $0 |

| I | J | K | L | M | N | O | P |
|---|---|---|---|---|---|---|---|
| 2 Cycle Delq. Amt. | 3 Cycle Delq. Amt. | 4 Cycle Delq. Amt. | Num. Delq. Last Year | Max. Bal. Last Year | Late Fees | Overlimit Fees | NSF Fees |
| $25 | $0 | $0 | 2 | $300 | $5 | $0 | $23 |
| $370 | $0 | $0 | 3 | $374 | $18 | $20 | $17 |
| $0 | $0 | $0 | 0 | $0 | $0 | $0 | $0 |
| $0 | $0 | $0 | 0 | $0 | $0 | $0 | $0 |
| $0 | $0 | $0 | 1 | $488 | $0 | $0 | $0 |
| $0 | $0 | $0 | 0 | $4,567 | $0 | $0 | $0 |
| $366 | $0 | $0 | 2 | $314 | $9 | $6 | $17 |
| $0 | $0 | $0 | 0 | $4,627 | $0 | $0 | $0 |
| $0 | $0 | $0 | 0 | $196 | $0 | $0 | $0 |
| $0 | $0 | $0 | 0 | $0 | $0 | $0 | $0 |
| $0 | $0 | $0 | 0 | $0 | $18 | $0 | $13 |
| $190 | $110 | $0 | 4 | $357 | $0 | $16 | $0 |
| $0 | $0 | $0 | 0 | $0 | $0 | $0 | $0 |
| $0 | $0 | $0 | 0 | $0 | $1 | $0 | $13 |
| $316 | $0 | $0 | 4 | $430 | $0 | $11 | $0 |
| $0 | $0 | $0 | 2 | $100 | $0 | $0 | $0 |
| $0 | $0 | $0 | 2 | $276 | $1 | $15 | $18 |
| $69 | $0 | $0 | 2 | $286 | $20 | $24 | $18 |
| $0 | $0 | $0 | 0 | $3,862 | $0 | $0 | $0 |
| $0 | $0 | $0 | 2 | $1,049 | $0 | $0 | $0 |
| $0 | $0 | $0 | 0 | $0 | $0 | $0 | $0 |

MATCH TO FIG. 9A

MATCH TO FIG. 10B

| Entity | Membership Probability | | |
|---|---|---|---|
| Account Number | Segment 1 | Segment 2 | Segment 3 |
| 54900984037300050 | 0.00 | 0.42 | 0.58 |
| 54902604744100090 | 0.00 | 0.57 | 0.43 |
| 54903703639800090 | 1.00 | 0.00 | 0.00 |
| 54909031952400020 | 0.73 | 0.27 | 0.00 |
| 54908541597301000 | 1.00 | 0.00 | 0.00 |
| 54907115614000050 | 0.38 | 0.62 | 0.00 |
| 54907917452500040 | 1.00 | 0.00 | 0.00 |
| 54904871840500080 | 0.48 | 0.32 | 0.20 |
| 54905210991900400 | 1.00 | 0.00 | 0.00 |
| 54900835499400600 | 0.94 | 0.06 | 0.00 |
| 54903691146100090 | 1.00 | 0.00 | 0.00 |
| 54904084086700060 | 1.00 | 0.00 | 0.00 |
| 54900211030400040 | 0.37 | 0.39 | 0.23 |
| 54903694789200400 | 0.64 | 0.36 | 0.00 |
| 54909147778260030 | 1.00 | 0.00 | 0.00 |
| 54904251764600010 | 0.40 | 0.08 | 0.52 |
| 54904415308400700 | 0.61 | 0.39 | 0.00 |
| 54909072440700070 | 0.83 | 0.17 | 0.00 |
| 54904468460400030 | 0.21 | 0.48 | 0.31 |
| 54909469362500040 | 0.17 | 0.63 | 0.19 |
| 54907653487000000 | 1.00 | 0.00 | 0.00 |
| 54908713564500700 | 0.42 | 0.58 | 0.00 |
| 54903262606700000 | 1.00 | 0.00 | 0.00 |
| 54906917211100010 | 1.00 | 0.00 | 0.00 |

| W | X | Y | Z | AA | AB |
|---|---|---|---|---|---|
| Total Utilization | Cash Utilization | Total Delq. Percent | Fees Percent | NSF Indicator | FICO Risk Indicator |
| 80.00% | 60.00% | 25.00% | 7.00% | 1 | 4 |
| 82.60% | 74.80% | 93.46% | 13.32% | 1 | 4 |
| 25.00% | 0.00% | 0.00% | 0.00% | 0 | 3 |
| 67.51% | 0.00% | 0.00% | 0.00% | 0 | 1 |
| 25.00% | 0.00% | 6.19% | 0.00% | 0 | 3 |
| 57.50% | 4.24% | 0.00% | 0.00% | 0 | 2 |
| 25.00% | 15.86% | 0.00% | 0.00% | 0 | 1 |
| 79.20% | 62.80% | 97.47% | 8.08% | 1 | 4 |
| 25.04% | 16.76% | 0.00% | 0.00% | 0 | 1 |
| 57.41% | 3.63% | 0.00% | 0.00% | 0 | 2 |
| 25.06% | 0.00% | 0.00% | 0.00% | 0 | 1 |
| 25.05% | 0.00% | 0.00% | 0.00% | 0 | 1 |
| 82.80% | 71.40% | 98.55% | 11.35% | 1 | 4 |
| 51.31% | 0.00% | 0.00% | 0.00% | 0 | 1 |
| 25.05% | 0.00% | 0.00% | 0.00% | 0 | 1 |
| 25.01% | 0.00% | 0.00% | 0.00% | 0 | 1 |
| 92.40% | 86.00% | 85.71% | 5.41% | 1 | 4 |
| 66.06% | 0.90% | 0.00% | 0.00% | 0 | 2 |
| 50.46% | 0.00% | 8.31% | 0.00% | 1 | 2 |
| 72.20% | 55.20% | 29.09% | 9.42% | 1 | 4 |
| 59.20% | 57.20% | 62.84% | 20.95% | 0 | 4 |
| 25.05% | 13.65% | 0.00% | 0.00% | 0 | 1 |
| 52.38% | 49.95% | 9.55% | 0.00% | 0 | 2 |
| 25.06% | 0.00% | 0.00% | 0.00% | 0 | 1 |

MATCH TO FIG.10A

MATCH TO FIG.11B

| AC | AE | AF | AG | AH |
|---|---|---|---|---|
| Entity | Probability of Accepting Offer | | | |
| Account Number | Credit Life Insurance | Magazine Offer | Convenience Checks | Free Gift |
| 54900984037300050 | 0.04 | 0.05 | 0.10 | 0.11 |
| 54902604744410090 | 0.06 | 0.05 | 0.12 | 0.13 |
| 54903703639800090 | 0.01 | 0.02 | 0.01 | 0.01 |
| 54909031952400020 | 0.02 | 0.03 | 0.02 | 0.03 |
| 54908541597301000 | 0.01 | 0.02 | 0.01 | 0.01 |
| 54907115614000050 | 0.04 | 0.03 | 0.06 | 0.07 |
| 54907917452500040 | 0.01 | 0.02 | 0.01 | 0.01 |
| 54904871840500080 | 0.04 | 0.04 | 0.07 | 0.08 |
| 54905210991900040 | 0.01 | 0.02 | 0.01 | 0.01 |
| 54900835499400060 | 0.01 | 0.02 | 0.01 | 0.02 |
| 54903691146100090 | 0.01 | 0.02 | 0.01 | 0.01 |
| 54904084086700060 | 0.01 | 0.02 | 0.01 | 0.01 |
| 54900211030400040 | 0.04 | 0.04 | 0.08 | 0.09 |
| 54903694789200040 | 0.02 | 0.03 | 0.02 | 0.03 |
| 54909147778260030 | 0.01 | 0.02 | 0.01 | 0.01 |
| 54904251764600010 | 0.02 | 0.04 | 0.05 | 0.04 |
| 54904415308400070 | 0.03 | 0.03 | 0.04 | 0.05 |
| 54909072440700070 | 0.02 | 0.02 | 0.02 | 0.03 |
| 54904468460400030 | 0.05 | 0.04 | 0.10 | 0.11 |
| 54909469362500040 | 0.06 | 0.05 | 0.12 | 0.13 |
| 54907653487000000 | 0.01 | 0.02 | 0.01 | 0.01 |
| 54908713564500070 | 0.03 | 0.03 | 0.06 | 0.07 |
| 54903262606700000 | 0.01 | 0.02 | 0.01 | 0.01 |
| 54906917211100010 | | | | |

| | AJ | AK | AL | AM |
|---|---|---|---|---|
| | | Predicted Revenue | | |
| | Credit Life Insurance | Magazine Offer | Convenience Checks | Free Gift |
| | $8.73 | $5.64 | $10.64 | $5.24 |
| | $10.75 | $5.11 | $12.23 | $5.67 |
| | $0.94 | $0.67 | $0.55 | $0.14 |
| | $1.11 | $0.72 | $0.84 | $0.26 |
| | $0.94 | $0.67 | $0.55 | $0.14 |
| | $3.52 | $1.39 | $3.17 | $1.13 |
| | $0.65 | $0.49 | $0.39 | $0.09 |
| | $5.50 | $2.46 | $5.72 | $2.23 |
| | $0.65 | $0.49 | $0.39 | $0.09 |
| | $1.02 | $0.64 | $0.69 | $0.18 |
| | $0.65 | $0.49 | $0.39 | $0.08 |
| | $0.65 | $0.49 | $0.39 | $0.08 |
| | $6.67 | $2.91 | $7.11 | $2.87 |
| | $1.29 | $0.82 | $1.01 | $0.33 |
| | $0.65 | $0.49 | $0.39 | $0.08 |
| | $0.65 | $0.49 | $0.39 | $0.08 |
| | $2.97 | $3.82 | $4.95 | $1.77 |
| | $2.38 | $1.05 | $2.09 | $0.68 |
| | $1.45 | $0.77 | $1.15 | $0.32 |
| | $8.37 | $3.67 | $8.91 | $3.94 |
| | $10.41 | $3.57 | $10.30 | $4.28 |
| | $0.65 | $0.49 | $0.39 | $0.09 |
| | $3.32 | $1.33 | $2.98 | $1.04 |
| | $0.65 | $0.49 | $0.39 | $0.08 |

MATCH TO FIG. 11A

US 8,190,512 B1

COMPUTER-IMPLEMENTED CLUSTERING SYSTEMS AND METHODS FOR ACTION DETERMINATION

CROSS-REFERENCE TO RELATED APPLICATIONS

This application claims priority to and the benefit of U.S. Application Ser. No. 60/902,379, (entitled "Computer-Implemented Systems and Methods For Action Determination" and filed on Feb. 20, 2007), of which the entire disclosure (including any and all figures) is incorporated herein by reference.

This application contains subject matter that may be considered related to subject matter disclosed in: U.S. Application Ser. No. 60/902,378, (entitled "Computer-Implemented Modeling Systems and Methods for analyzing Computer Network Intrusions" and filed on Feb. 20, 2007); U.S. Application Ser. No. 60/902,380, (entitled "Computer-Implemented Semi-supervised Learning Systems And Methods" and filed on Feb. 20, 2007); U.S. Application Ser. No. 60/902,381, (entitled "Computer-Implemented Guided Learning Systems and Methods for Constructing Predictive Models" and filed on Feb. 20, 2007); U.S. Application Ser. No. 60/786,039 (entitled "Computer-Implemented Predictive Model Generation Systems And Methods" and filed on Mar. 24, 2006); U.S. Application Ser. No. 60/786,038 (entitled "Computer-Implemented Data Storage For Predictive Model Systems" and filed on Mar. 24, 2006); and to U.S. Provisional Application Ser. No. 60/786,040 (entitled "Computer-Implemented Predictive Model Scoring Systems And Methods" and filed on Mar. 24, 2006); of which the entire disclosures (including any and all figures) of all of these applications are incorporated herein by reference.

TECHNICAL FIELD

This document relates generally to computer-implemented clustering systems and more particularly to performing clustering operations for determining action(s) to be taken with respect to an entity.

BACKGROUND

The financial industry processes an inordinate number of transactions for their current or prospective customers. Many of these transactions demand that some action be taken on the part of a financial company in order to more completely handle a transaction. As an example, an individual working for a credit card company may be tasked with determining which credit card transactions require an investigation or inquiry into whether a transaction may be fraudulent. The problem may be further compounded if there are multiple possible actions that can be taken with respect to the transactions. Current methods have difficulty in providing an automated or semi-automated mechanism for determining what action if any should be taken for a particular individual or groups of individuals.

SUMMARY

In accordance with the teachings provided herein, systems and methods for operation upon data processing devices are provided for determining one or more actions to be taken with respect to a first entity. As an example, a computer-implemented method and system can be configured to receive data that is related to characteristics of the first entity as well as data that is related to a plurality of segments. Assignments are determined between the first entity and the segments based upon the characteristics of the first entity and the characteristics associated with the segments. A determined assignment includes a membership probability that is indicative of how probable is membership of the first entity with respect to a segment. One or more actions are determined for the first entity based upon the membership probabilities and action information associated with the assigned segments.

As another example, a computer-implemented method and system can be configured to receive data that is related to characteristics of the first entity as well as data that is related to a plurality of segments. A segment identifies entities having one or more similar characteristics. A segment is associated with action information. Assignments are determined between the first entity and the segments based upon the characteristics of the first entity and the characteristics associated with the segments. A determined assignment includes a membership probability that is indicative of how probable is membership of the first entity with respect to a segment. One or more actions are determined for the first entity based upon the membership probabilities and the action information associated with the assigned segments.

BRIEF DESCRIPTION OF THE DRAWINGS

FIGS. 9A-11B illustrate example data for use in determining segment assignments.

DETAILED DESCRIPTION

Figure 1:
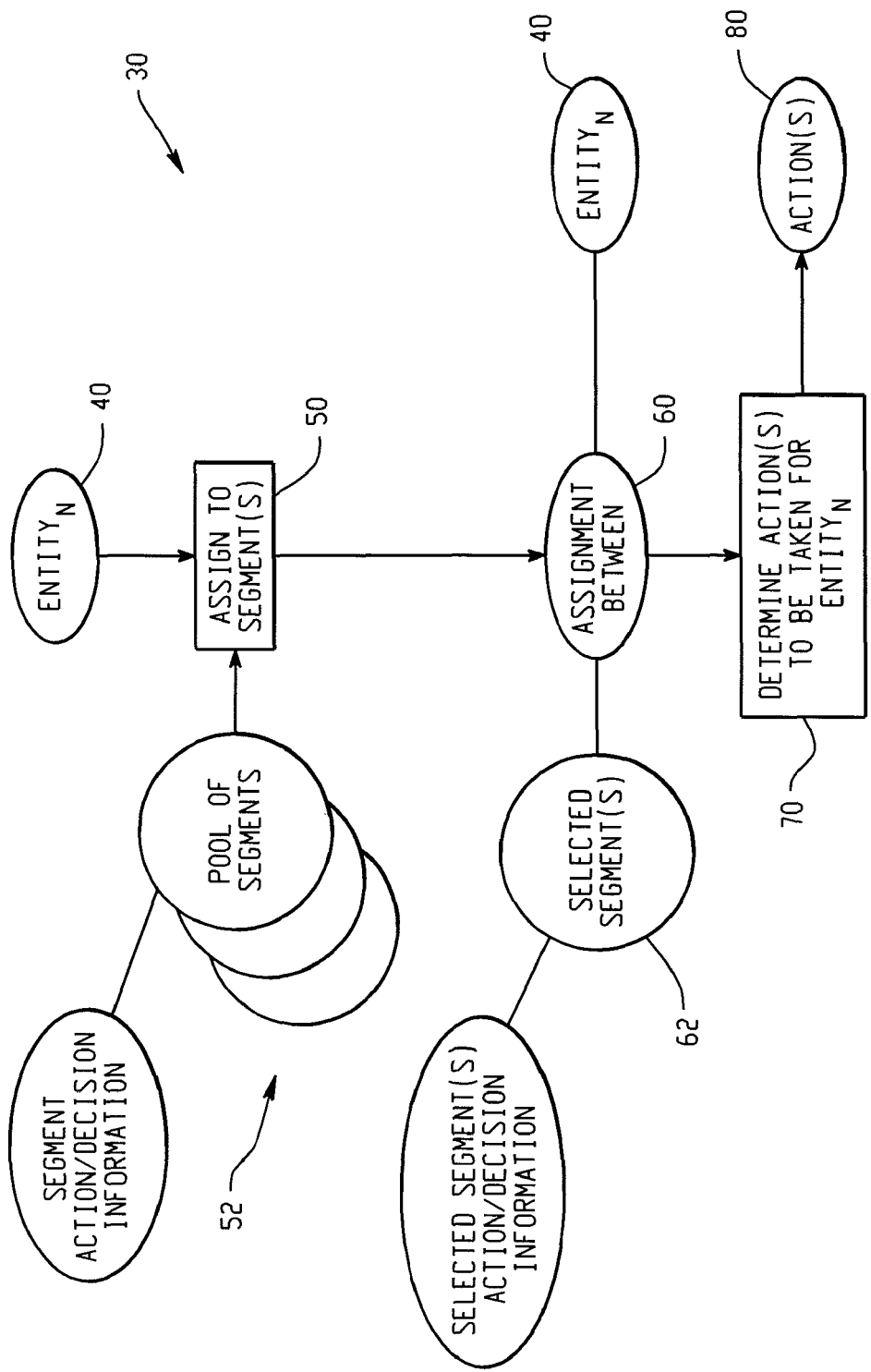
FIG. 1 is a block diagram depicting software and computer components utilized in determining what action should be taken with respect to an entity.

FIG. 1 depicts at 30 a computer-implemented system for determining one or more actions 80 to be taken with respect to an entity 40 such as an individual or organization. An action could include for example whether a credit card company should investigate if fraud may have occurred with respect to a particular credit card holder. As another example, an action could include whether to approve a loan application for an individual. It should also be understood that the system 30 can be configured to process one entity or many entities.

System 30 determines what action or actions 80 should be performed with respect to an entity 40. In system 30, process 50 creates assignments 60 between segments and the entity 40. Each of the segments is associated with action information (e.g., decision information) so that if an assignment 60 is made between the entity 40 and a particular segment, that particular segment's associated action information is also made part of the assignment. The action information of a selected segment 62 is then used by process 70 to determine what action 80 (if any) should be performed with respect to the entity 40.

The types of candidate segments in pool 52 depends upon the situation at hand. For example within a credit card transaction processing environment, segments can include, among others, a revolver segment and a transactor segment. In this example, a revolver segment includes segment entity members who roll over part of the bill to the next month, instead of paying off the balance in full each month. A transactor segment includes segment entity members who typically pay off the balance in full each month. Accordingly, if an entity is assigned to the revolver segment, then the action information (e.g., raise the entity's credit limit, etc.) associated with the revolver segment is used to determine what action should be taken for the entity.

It should be understood that many different types entities can be processed by the system 30. As an illustration, entities can be an individual or a collection of individuals (e.g., companies) that are conducting financial transactions. Moreover an entity does not have to constitute individuals but an entity rather may be representative of another aspect of the process for which determination of an action needs to be performed.

Figure 2:
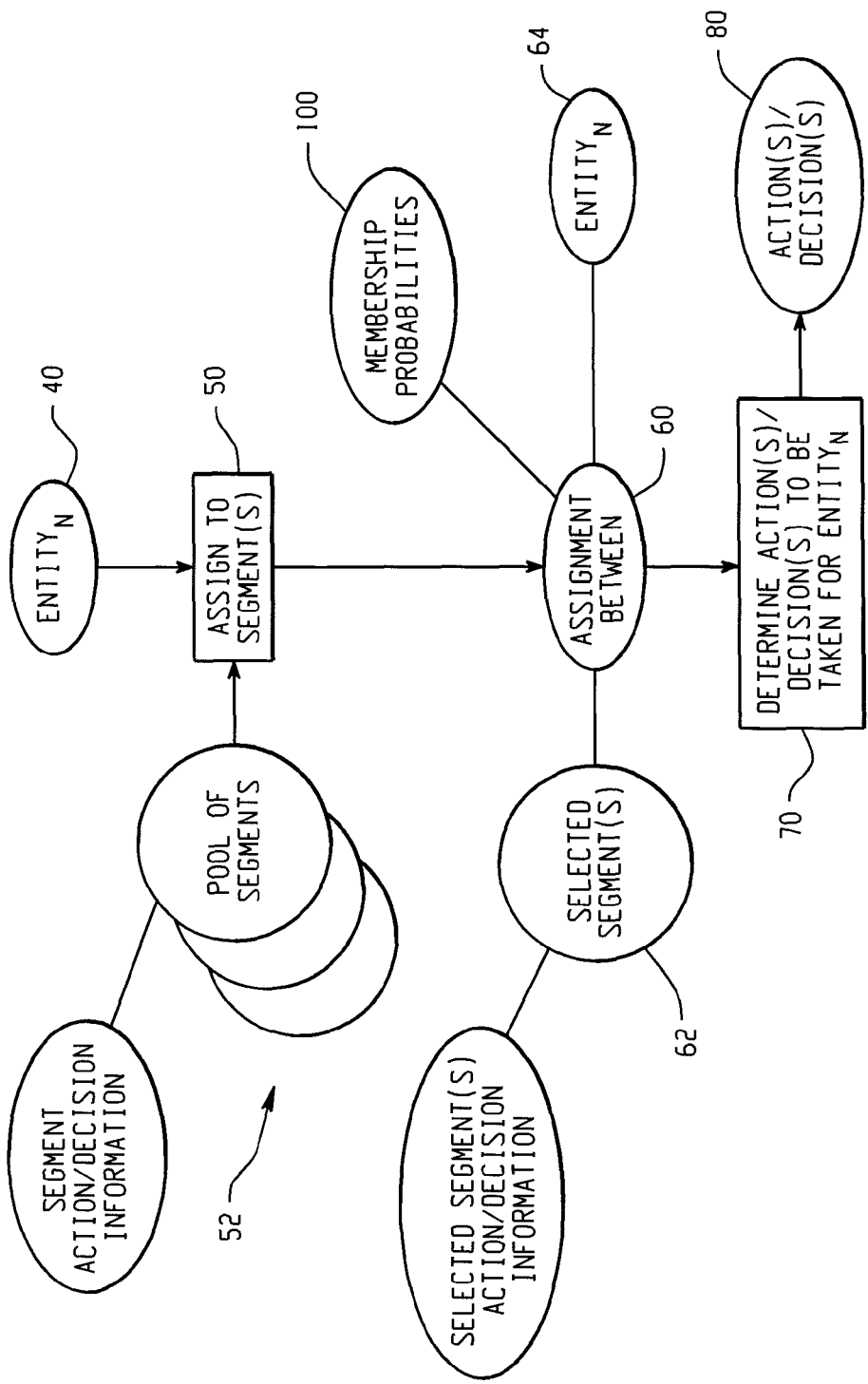
FIG. 2 is a block diagram depicting an assignment between a segment and an entity.

FIG. 2 illustrates that an assignment 60 between a segment 62 and an entity 64 includes a membership probability 100. A membership probability is indicative of how probable is membership of the entity is with respect to an assigned segment. In other words, a membership probability indicates that there is less than certainty regarding whether an entity should be part of (e.g., a member) of a segment.

Figure 3:
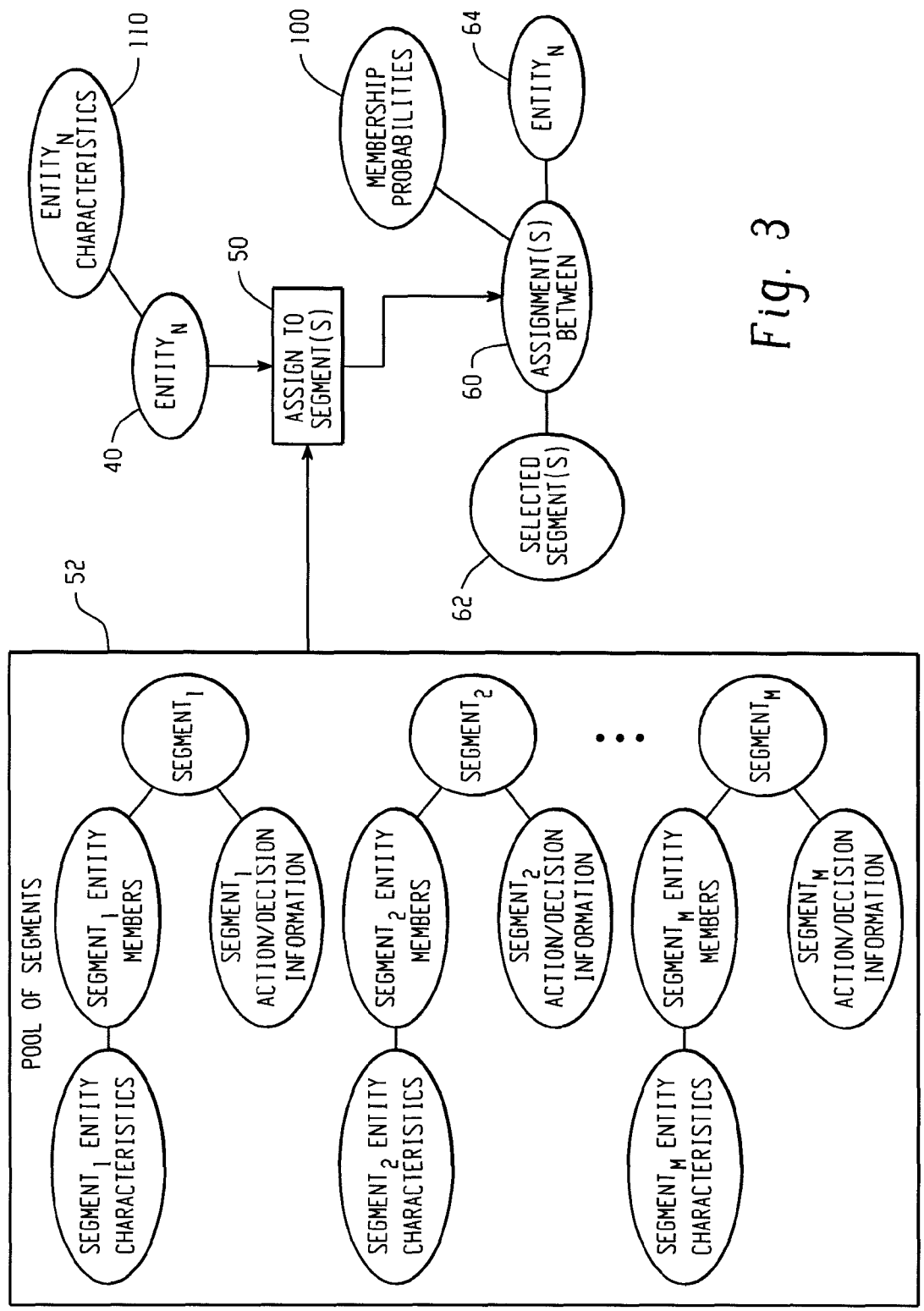
FIG. 3 is a block diagram depicting assignments being created for an entity based upon the characteristics associated with the entity.

With reference to FIG. 3, process 50 makes assignments 60 for an entity 40 based upon the characteristics 110 that are associated with the entity 40. More specifically, the determination of the assignments 60 between an entity 40 and the pool of segments 52 is based upon a comparison of the characteristics 110 of the entity 40 with the characteristics associated with the candidate segments 52. The comparison of characteristics results in generating the value for the membership probability that is associated with an assignment 60. As an illustration, the more similar the characteristics 110 of an entity 40 are with respect to characteristics of a particular segment, the higher the membership probability value 100 will be for the assignment that is created between the entity and that particular segment. Conversely, the less similar the characteristics 110 of an entity 40 are with respect to characteristics of a particular segment, the lower the membership probability value 100 will be for the assignment that is created between the entity and that particular segment. For situations where an entity 40 is significantly or entirely dissimilar from a segment, an assignment does not have to be made or the value of the membership probability can be set relatively low or to a zero value.

Figure 4:
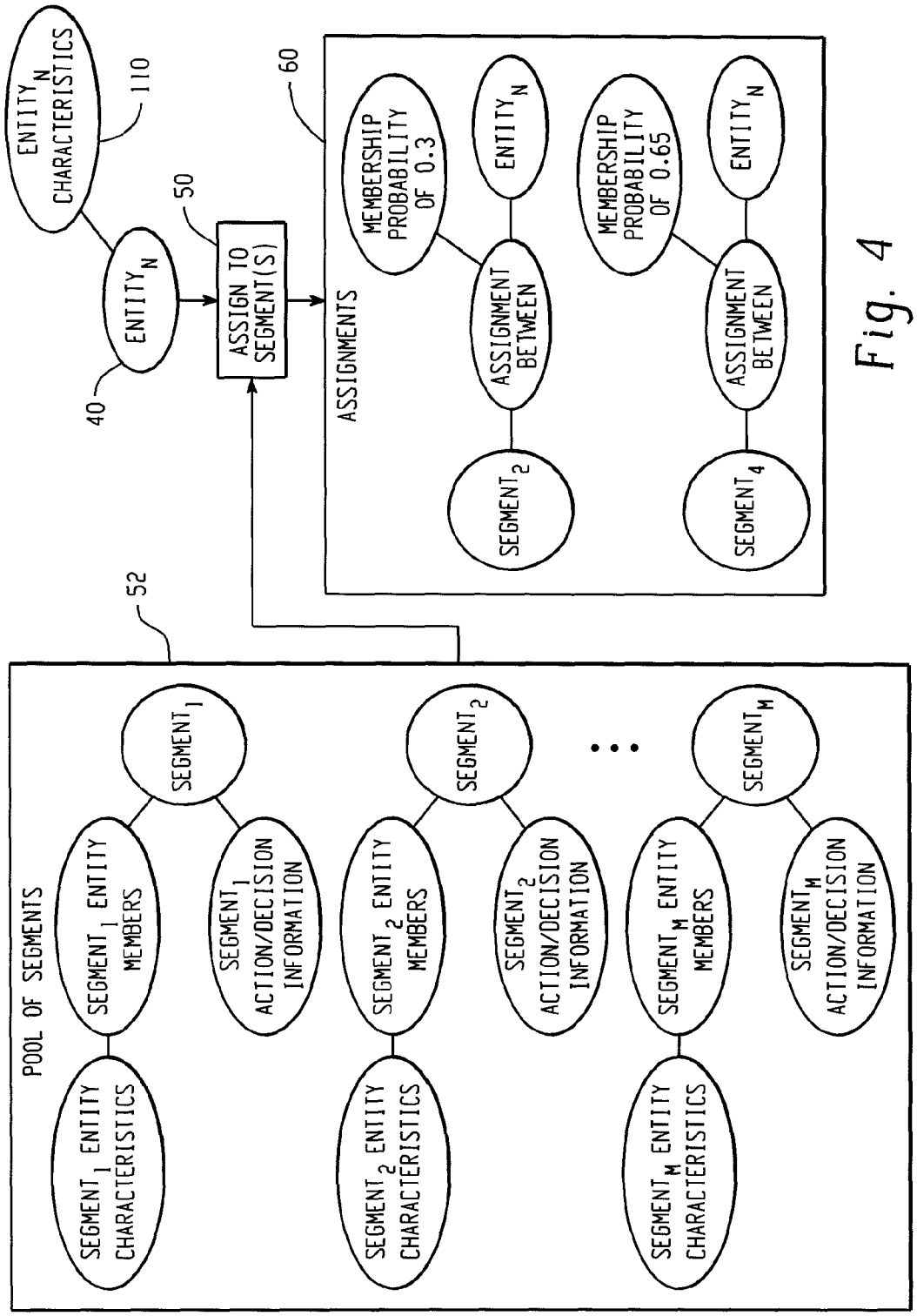
FIG. 4 is a block diagram depicting an example of assignment.

FIG. 4 provides an example of assignment 60. In this example, the pool of segments 52 contains "M" number of segments. Associated with each segment are entity members that have been previously determined to belong to a particular segment as well as their respective characteristics. One or more actions are also associated with a segment. In this example, based upon a comparison of the characteristics 110 of the entity 40 with the characteristics of each segment, process 50 creates the assignments shown at 60.

The assignments 60 include an assignment between the entity and the second segment from the pool of segments 52. There is also an assignment between the entity and the fourth segment. By evaluating the characteristics 110 of the entity 40 with the segments' associated characteristics, process 50 has determined that the assignment between the second segment and the entity has a membership probability value of 0.3. Process 50 has also determined that the assignment between the fourth segment and the entity has a membership probability value of 0.65.

Figure 5:
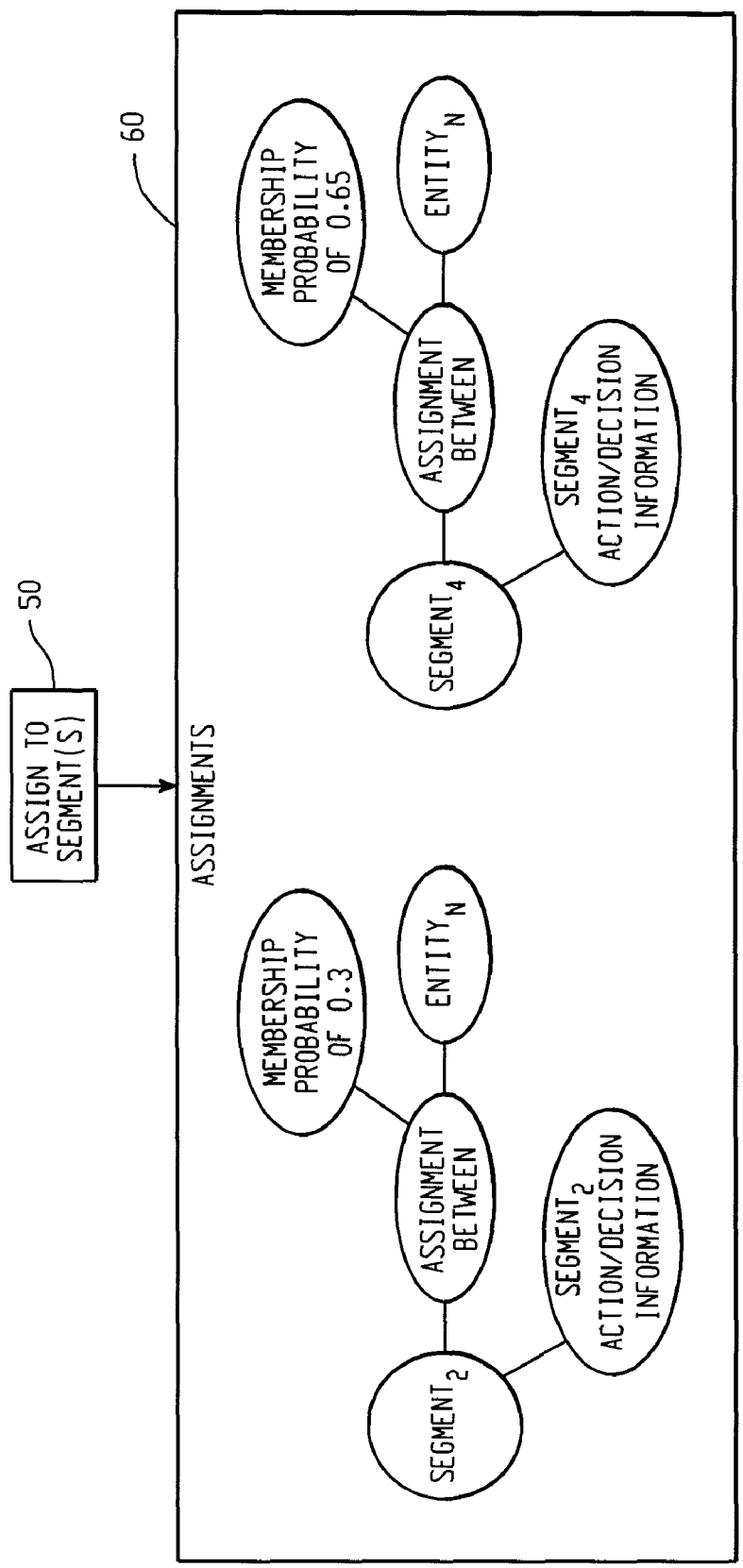
FIG. 5 is a block diagram depicting that the action information of each of the selected segments can be made part of the assignment.
Figure 6:
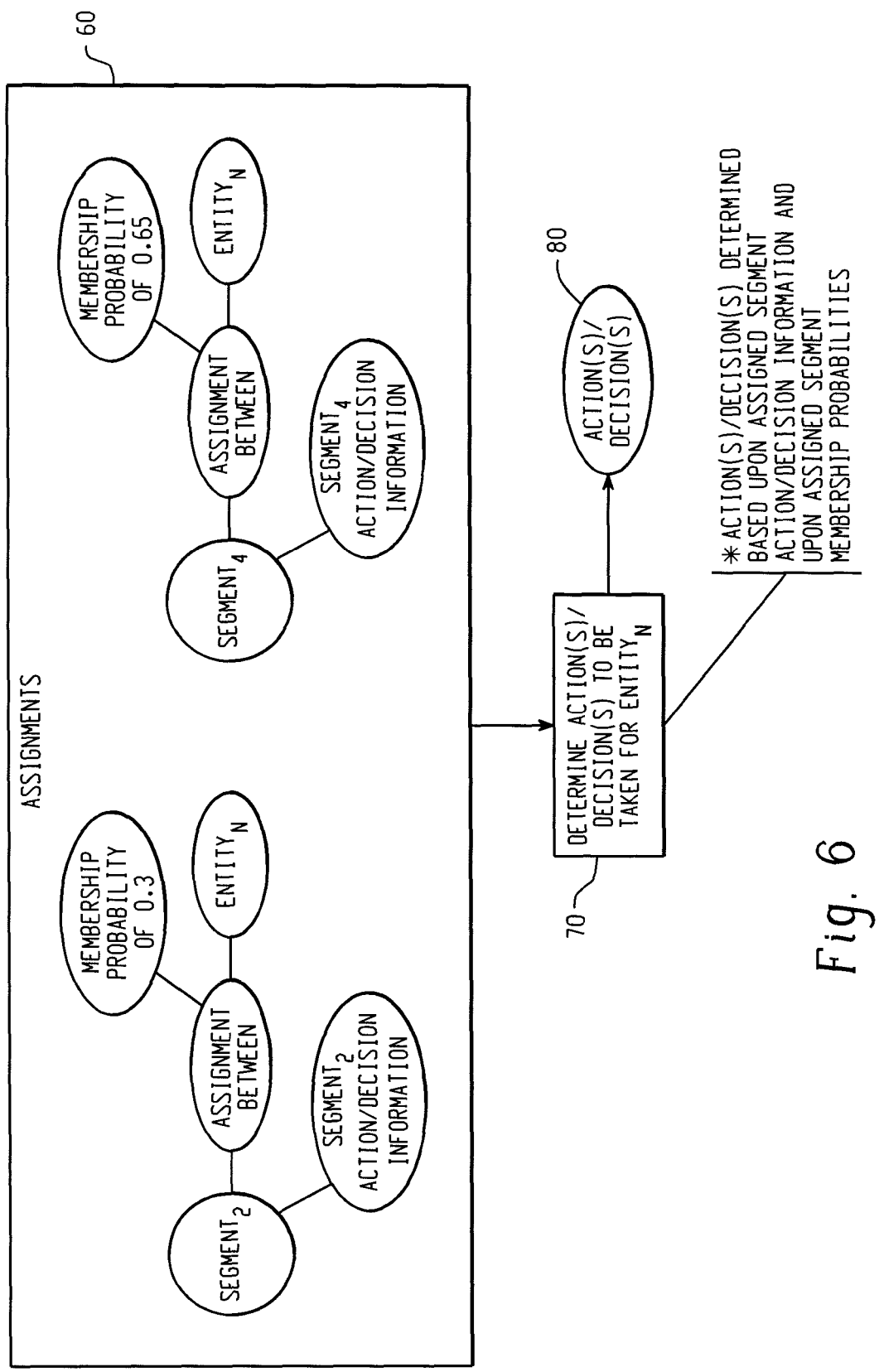
FIG. 6 is a block diagram depicting use of action information associated with selected segments to determine what action should be performed with respect to the entity.

FIG. 5 illustrates that the action information of each of the selected segments is made part of the assignment. FIG. 6 shows that process 70 uses the action information associated with the selected segments for determining what action (if any) should be performed with respect to the entity.

As indicated by the higher value in this example, process 50 of FIG. 5 had determined that the entity has a greater degree of membership (e.g., participation) in the fourth segment than it does in the second segment. Accordingly greater weight is accorded by process 70 (of FIG. 6) to the actions associated with the fourth segment than with the second segment. The varying weights can be used to establish a prioritization of actions to be taken with respect to the entity under analysis.

Process 70 of FIG. 6 indicates the building of action-effect models that help assign actions to different entities. A separate action-effect model is built for each segment. Entities in a segment are weighted by their membership probabilities in the segment under consideration while building the action-effect model. It should be noted that soft clustering provides a means for building better action-effect models by providing more entities for building the action-effect models. Absent soft-clustering, other data augmentation techniques such as design of experiments would have to be used to build better action-effect models. Process 80 of FIG. 6 indicates the decisions made for each entity using the action-effect model.

It should be understood that similar to the other processing flows described herein, the steps and the order of the steps in this example may be altered, modified, removed and/or augmented and still achieve the desired outcome. As an example, a multiprocessing or multitasking environment can allow two or more steps to be executed concurrently.

Figure 7:
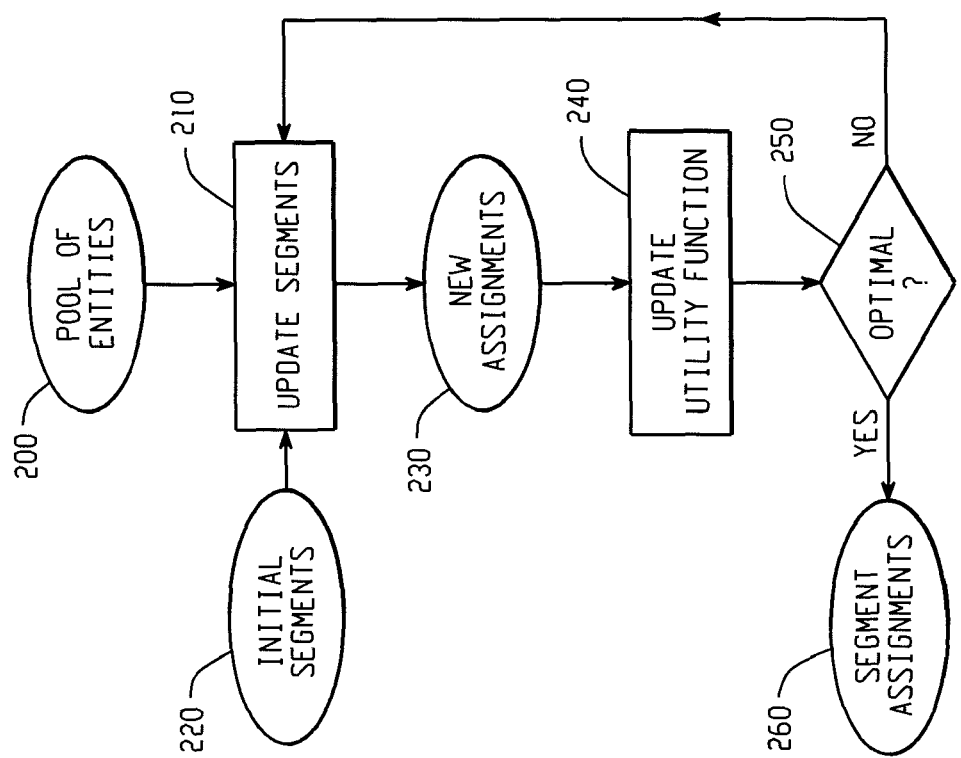

A process for determining what segment should be assigned to which entities can take many forms. For example, the segments can be designed to optimize a predefined utility function, such as such as credit risk, attrition risk, profitability etc. FIG. 7 illustrates where an initial set of segments 220 and a pool of entities 200 are selected in order for process 210 to update the assignments between the entities 200 and the current segments 220. The results of the updating of the segments by process 210 is a set of new assignments 230 between the entities and the segments. Process 240 computes the utility function based upon the new assignments 230. If an optimal solution has not been reached as determined by process 250, then processing returns to process 210 so that the procedure can be repeated until there is convergence. When an optimal solution has been reached as determined by process 250, then the assignments 230 are finalized as segment assignments 260. Segment assignments 260 can then be used in determining actions for the entities.

Figure 8:
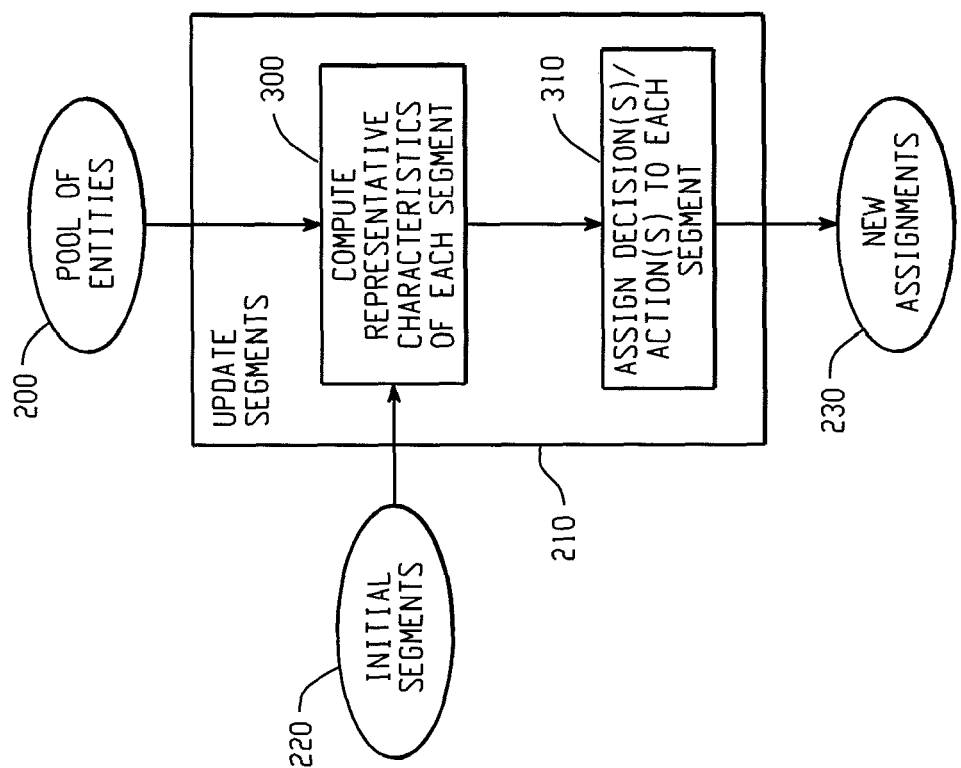
FIGS. 7 and 8 are flow charts for determining segment assignments.

FIG. 8 provides an example of additional details that can be used when updating the segments via process 210. Process 210 includes in this example computing representative characteristics of each segment 300. The computing of representative characteristics may involve finding the statistical representation of the entities associated with the segment.

Process 310 then assigns actions to each of the segments. This assignment at process 310 can include analyzing historical data of a segment to determine which actions were more effective in handling entities contained within the segment. The more effective actions can then be assigned to the segment.

It should be understood that assignments can be created in other ways, such as by performing a design of experiments using the characteristics of the first entity and the characteristics associated with the segments. An example of using a design of experiments for this purpose includes identifying the effect of credit line increase on credit risk, profitability etc.

FIGS. 9A-11B provide another example of determining one or more actions to be taken with respect to an entity. FIGS. 9A-9B depict multiple entities (e.g., credit card accounts) for processing. Associated with each account are the following raw data items: FICO number (i.e., a number from a credit scoring model that determines the likelihood of repayment), the account's statement balance, merchant balance, credit line, and a specific purchase amount. The raw data also includes account cycle data at different times: first cycle delinquent amount, second cycle delinquent amount, etc. Other raw data includes: number of delinquent payments in the preceding year, maximum balance last year, late fees paid last year, overlimit fees, and non-sufficient funds (NSF) fee amounts.

FIGS. 10A-10B depict membership probabilities being calculated based upon the raw data of FIGS. 9A-9B. The membership probabilities include three segments that are defined in this example as follows: segment 1 is a segment for containing accounts that can be considered situational revolvers; segment 2 is a segment for containing accounts that can be considered situational transactors; and segment 3 is a segment for containing accounts that can be considered situational cash revolvers.

As a description of each of these categories, situational cash revolvers can be defined as a customer who has carried a cash revolving balance at least 2 consecutive months out of the last 6 months; situational revolvers can be defined as a customer who is not a situational cash revolver but has carried a revolving balance at least 2 consecutive months out of the last 6 months; and situational transactors can be defined as any customer who does not fall into the aforementioned two categories. For example, segment 1 can contain, to an extent as specified by a membership probability, accounts having statement balances greater than $1000, credit limit less than $5000, late fees less than $50, and delinquency amount less than $100.

As an illustration, for the first account (i.e., account number 5490098403730050), the membership probability for segment 1 is 0.00 since the first account did not share to any significant extent the characteristics that are used to describe segment 1. The first account has a membership probability of 0.42 for the second segment and has a membership probability of 0.58 for the third segment. These membership probabilities show to what extent the first account can be considered a member of a particular segment (e.g., to what extent an account can be considered a situational revolver, a situational transactor, and a situational cash revolver) and are determined based upon how well the account's characteristics compare to characteristics that define the segments. Different comparison algorithms can be used to determine to what extent an account should be clustered with a particular segment, such as a standard k-means clustering method.

Without a membership probability approach, another approach (e.g., a hard segmentation approach) that is used for model building can misclassify customers that for example have revolved 3 out of the last 6 months, but not consecutively, such as every other month. With membership probabilities, these customers are likely to have a higher probability of membership in the "situational revolver" segment and their data will be used appropriately. With the hard segmentation approach, these customers would be classified as "situational transactors" and the models are not likely to be as predictive.

The action-effect models can be used to determine what action should be taken with respect to an entity. In this example, an action can be what product (e.g., credit life insurance, magazine, convenience checks, and a free gift) should be offered to the customer holding the account. Probabilities of offer acceptance are determined based upon the action-effect models. Additional information (e.g., the derived variable data of FIGS. 10A-10B) can be used in the determining the probabilities of acceptance. FIGS. 11A-11B depict examples of the action-effect models. Two types of models are built for each segments, the first being the probability that the entity will accept the offer, and the second being the revenue generated from this entity if the offer is accepted. The following are example determinations of probabilities of accepting a product offer:

$AE5$(i.e., the first account's probability of accepting credit life insurance=0.04=$\$S5*(0.01+0.06*\$W5/100+0.03*\$Y5/100+0.03*\$AA5/100)+\$T5*(0.01+0.03*\$W5/100+0.02*\$X5/100+0.01*\$Y5/100+0.02*\$Z5+0.01*\$AA5/100+0.02*\$AB5)+\$U5*(0.01+0.06*\$W5/100+0.03*\$Y5/100+0.03*\$AA5/100)$ $AF5=0.05=S5*(0.02+0.07*W5/100+0.04*Y5/100)+T5*(0.04+0.05*W5/100+0.04*Y5/100+0.03*Z5+0.03*AA5/100)+T5*(0.06+0.04*W5/100+0.05*Y5/100)$ $AG5=0.10=\$S5*(0.01+0.03*\$Z5/100)+\$T5*(0.01+0.01*\$W5/100+0.01*\$Y5/100+0.01*\$Z5+0.03*\$AA5/100+0.04*\$AB5)+\$U5*(0.01+0.07*\$W5/100+0.06*\$X5+0.06*\$Y5/100)$ $AH5=0.11=\$S5*(0.01+0.01*\$W5/100+0.03*\$X5/100+0.03*\$AB5/100)+\$T5*(0.02+0.02*\$W5+0.02*\$X5/100+0.04*\$AB5)+\$U5*(0.04+0.06*\$W5/100+0.07*\$X5/100+0.03*\$AB5/100)$ The membership probabilities can also be used to predict revenue:

$AJ5$=(i.e., the first account's predicted revenue with respect to credit life insurance)=$\$8.73=AE5*(\$S5*(50+12.6*\$Z5/100+14.3*\$AB5)+\$T5*(66.1+13.4*\$Z5/100+23.9*\$AB5)+\$U5*(81.9+14.7*\$Z5/100+34.1*\$AB5))$ $AK5=\$5.64=AF5*(\$S5*(20.1+7.6*\$Z5/100+4.3*\$AB5)+\$T5*(26.1+7.4*\$Z5/100+12.4*\$AB5)+\$U5*(31.9+6.4*\$Z5/100+24.1*\$AB5))$ $AL5=\$10.64=AG5*(\$S5*(30.4+91*\$Z5/100+8.3*\$AB5)+\$T5*(34.1+8.9*\$Z5/100+11.4*\$AB5)+\$U5*(41.3+8.7*\$Z5/100+21.6*\$AB5))$ $AM5=\$5.25=AH5*(\$S5*(6.1+4.3*\$Z5/100+2.1*\$AB5)+\$T5*(9.3+6.9*\$Z5/100+4.6*\$AB5)+\$U5*(14.6+7.9*\$Z5/100+12.5*\$AB5))$ While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the systems and methods may be implemented on various types of computer architectures, such as for example on a networked system, on a single general purpose computer, etc.

Figure 12:
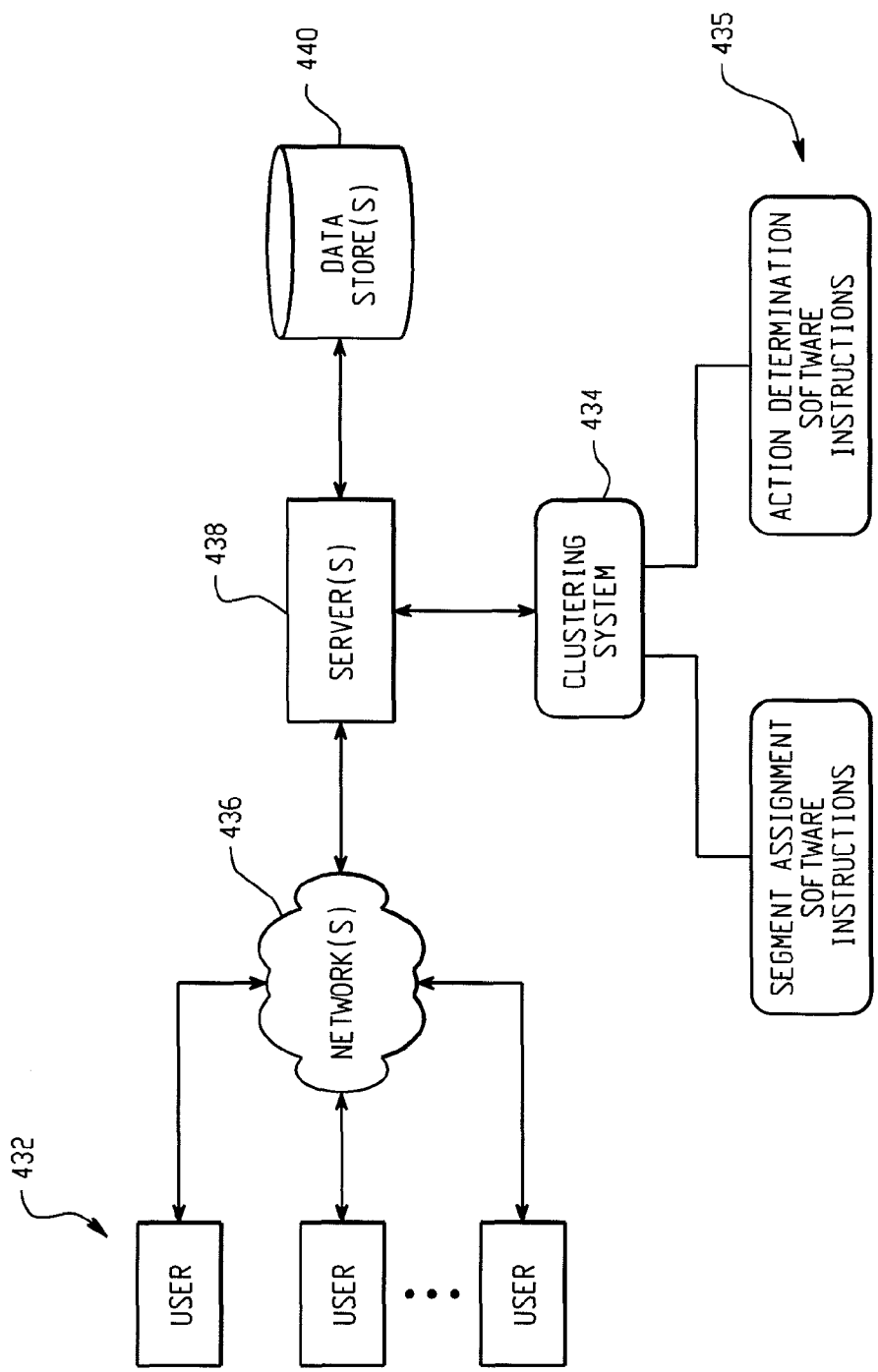
FIG. 12 is a block diagram depicting a networked environment wherein users can interact with a clustering system that assists in determining what action should be performed with respect to an entity.

As an illustration, FIG. 12 depicts a networked environment wherein users 432 can interact with a clustering system 434. The users 432 can interact with the clustering system 434 through a number of ways, such over one or more networks 436.

A server 438 accessible through the network(s) 436 can host the clustering system 434. The same server or different servers can contain the various software instructions 435 (e.g., instructions for creating segment assignments, instructions for determining which actions should be taken, etc.) or modules of the clustering system 434. Data store(s) 440 can store the data to be analyzed as well as any intermediate or final data calculations and data results.

The clustering system 434 can be a web-based analysis and reporting tool that provides users flexibility and functionality for performing action determination for one or many entities. Moreover, the clustering system 434 can be used separately or in conjunction with other software programs, such as with other decision making software techniques.

Figure 13:
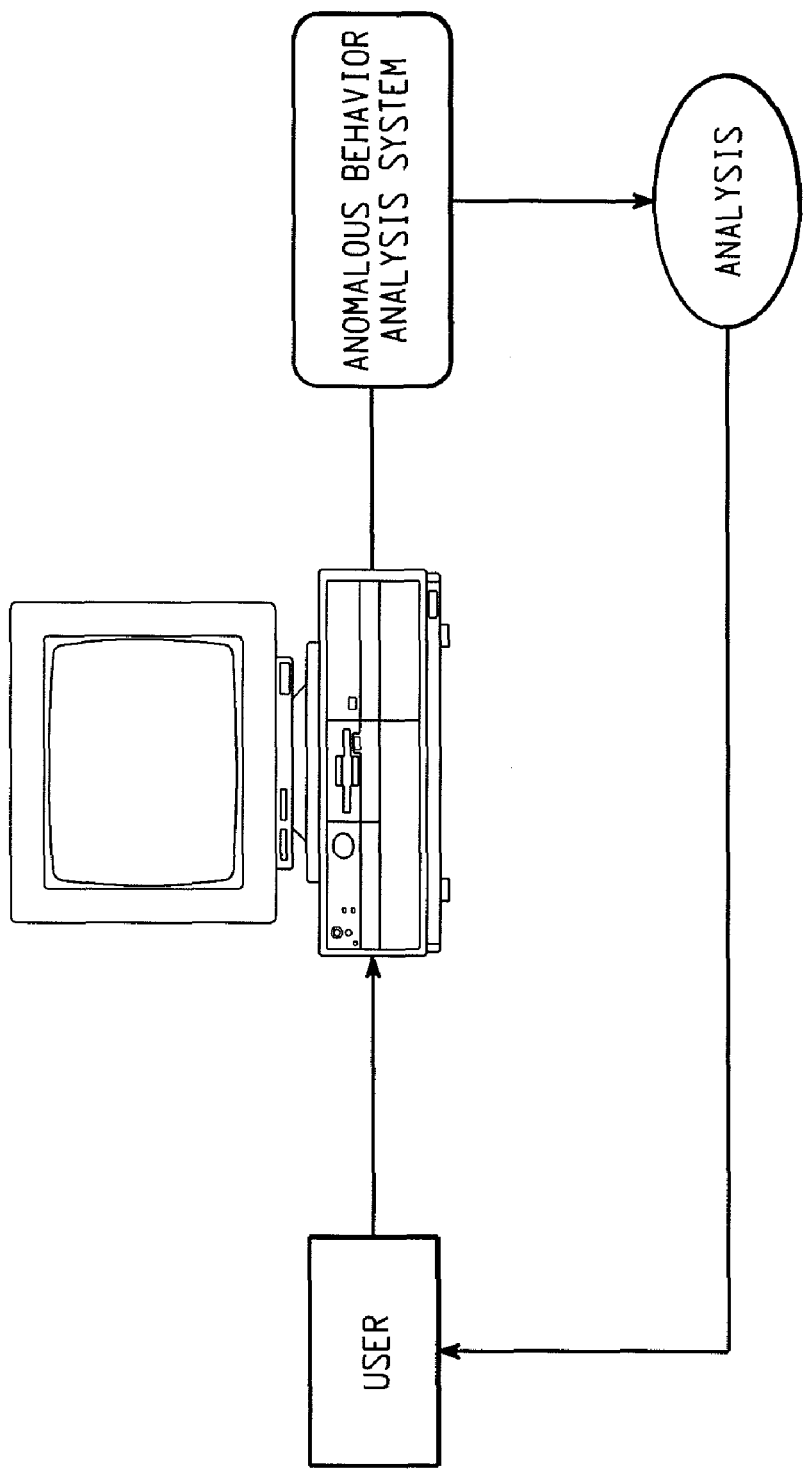
FIG. 13 is a block diagram depicting a stand-alone computer wherein a user can interact with a clustering system that assists in determining what action should be performed with respect to an entity.

It should be understood that the clustering system 434 can be implemented in many different ways, such as on a standalone computer for access by a user as shown in FIG. 13.

It is further noted that the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for determining one or more actions, comprising:

receiving, using one or more processors, data related to one or more characteristics associated with an entity;

receiving, using the one or more processors, data related to a plurality of segments that are associated with the one or more characteristics, wherein each segment is associated with action information;

determining, using the one or more processors, assignments between the entity and the plurality of segments based upon a comparison of the one or more characteristics associated with the entity and the one or more characteristics associated with the plurality of segments, wherein an assignment includes membership probabilities indicating the extent to which the entity can be considered a member of two or more segments at any point in time, thereby avoiding misclassification caused by a hard-segmentation approach, and wherein determining the assignments includes:

determining a first assignment between the entity and a first segment by calculating a first membership probability that includes a value indicating a certainty level of entity membership in the first segment, and determining a second assignment between the entity and a second segment by calculating a second membership probability that includes a value indicating a certainty level of entity membership in the second segment;

building, using the one or more processors, an action-effect model corresponding to the entity, wherein building includes using soft-clustering and weighting the entity according to membership probabilities indicating the extent to which the entity can be considered a member of each segment in the plurality of segments; and using the action-effect model to determine, using the one or more processors, one or more actions for the entity based upon the membership probabilities associated with the entity and the action information associated with each assigned segment.

2. The method of claim 1, wherein the entity is an individual that has been determined to be a credit risk, and wherein the one or more actions are in relation to the individual.

3. The method of claim 2, wherein a credit risk predictive model is used to determine whether the individual is a credit risk.

4. The method of claim 1, wherein determining the assignments further includes:
determining a third assignment between the entity and a third segment by calculating a third membership probability that includes a value indicating a certainty level of entity membership in the third segment.

5. The method of claim 1, further comprising:
performing a design of experiments using the one or more characteristics associated with the entity and the one or more characteristics associated with the plurality of segments in order to determine the assignments between the entity and the plurality of segments.

6. The method of claim 1, wherein the comparison of the characteristics includes determining a degree of similarity between the one or more characteristics associated with the entity and the one or more characteristics associated with the plurality of segments.

7. The method of claim 1, wherein the action information that is associated with a segment includes one or more actions or decisions that have been taken with respect to one or more entities associated with the segment.

8. The method of 1, wherein the assigned segments are prioritized based on the membership probabilities.

9. The method of claim 1, wherein one of the segments is a revolver segment and another of the segments is a transactor segment.

10. The method of claim 9, wherein the revolver segment includes segment entity members who roll over part of a bill to a next month; and wherein the transactor segment includes segment entity members who pay off a balance in full each month.

11. The method of claim 1, wherein when the plurality of segments optimize a pre-specified utility function, the method further includes:
selecting an initial set of segments from the plurality of segments;
updating the assignments between entities and the initial set of segments; and
computing the utility function based upon the updated assignments.

12. The method of claim 11, wherein updating the assignments comprises:
computing representative characteristics for each of the segments in the initial set of segments; and
assigning updated action information to each of the segments.

13. The method of claim 1, further comprising:
using a membership probability of an assignment to determine a weight for action information associated with an assigned segment.

14. The method of claim 1, wherein the one or more actions relate to handling financial transactions.

15. The method of claim 14, wherein financial transactions include credit card transactions or debit card transactions of loan application transactions.

16. Computer software stored on one or more non-transitory computer readable mediums, the computer software comprising program code for carrying out a method for determining one or more actions, the method comprising:
receiving, using one or more processors, data related to one or more characteristics associated with an entity
receiving data related to a plurality of segments that are associated with the one or more characteristics, wherein each segment is associated with action information;
determining assignments between the entity and the plurality of segments based upon a comparison of the one or more characteristics associated with the entity and the one or more characteristics associated with the plurality of segments, wherein an assignment includes membership probabilities indicating the extent to which the entity can be considered a member of two or more segments at any point in time, thereby avoiding misclassification caused by a hard-segmentation approach, and wherein determining the assignments includes:
determining a first assignment between the entity and a first segment by calculating a first membership probability that includes a value indicating a certainty level of entity membership in the first segment, and
determining a second assignment between the entity and a second segment by calculating a second membership probability that includes a value indicating a certainty level of entity membership in the second segment;
building an action-effect model corresponding to the entity, wherein building includes using soft-clustering and weighting the entity according to membership probabilities indicating the extent to which the entity can be considered a member of each segment in the plurality of segments; and
using the action-effect model to determine one or more actions for the entity based upon the membership probabilities associated with the entity and the action information associated with each assigned segment.

17. A system for determining one or more actions, comprising:
a non-transitory computer-readable media for storing software instructions;
one or more processors coupled to the computer-readable media and configured to:
receive, using one or more processors, data related to one or more characteristics associated with an entity
receive data related to a plurality of segments that are associated with the one or more characteristics, wherein each segment is associated with action information;
determine assignments between the entity and the plurality of segments based upon a comparison of the one or more characteristics associated with the entity and the one or more characteristics associated with the plurality of segments, wherein an assignment includes membership probabilities indicating the extent to which the entity can be considered a member of two or more segments at any point in time, thereby avoiding misclassification caused by a hard-segmentation approach, and wherein determining the assignments includes:
determining a first assignment between the entity and a first segment by calculating a first membership probability that includes a value indicating a certainty level of entity membership in the first segment, and
determining a second assignment between the entity and a second segment by calculating a second membership probability that includes a value indicating a certainty level of entity membership in the second segment;
build an action-effect model corresponding to the entity, wherein building includes using soft-clustering and weighting the entity according to membership probabilities indicating the extent to which the entity can be considered a member of each segment in the plurality of segments; and
use the action-effect model to determine one or more actions for the entity based upon the membership probabilities associated with the entity and the action information associated with each assigned segment.

* * * * *